Sept. 15, 1964     E. G. GAGE     3,148,709

CHANGE BOX CONTROL

Filed June 26, 1962     6 Sheets-Sheet 1

INVENTOR.
EDWIN G. GAGE
BY
Raymond A. Paquin
ATTORNEY.

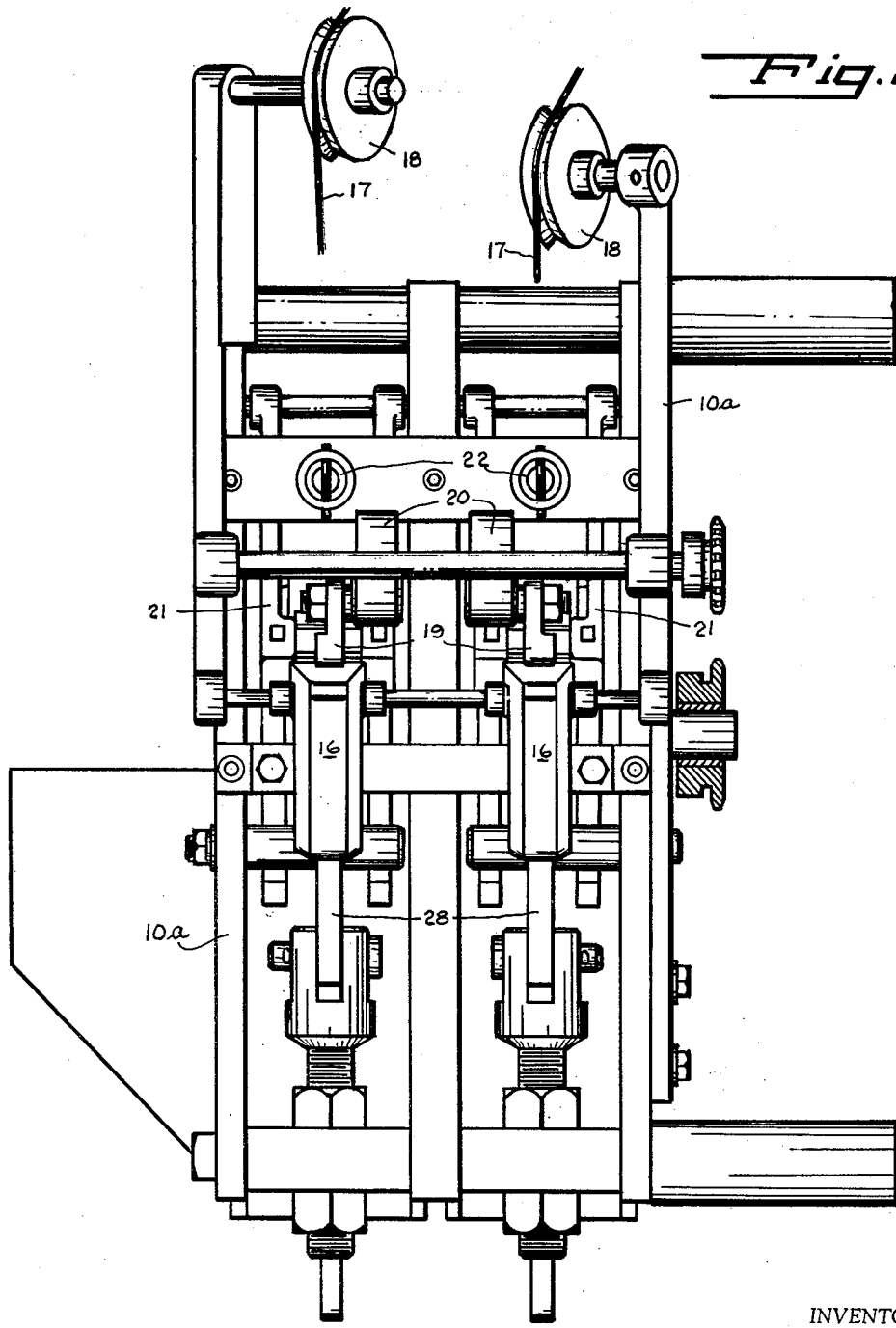

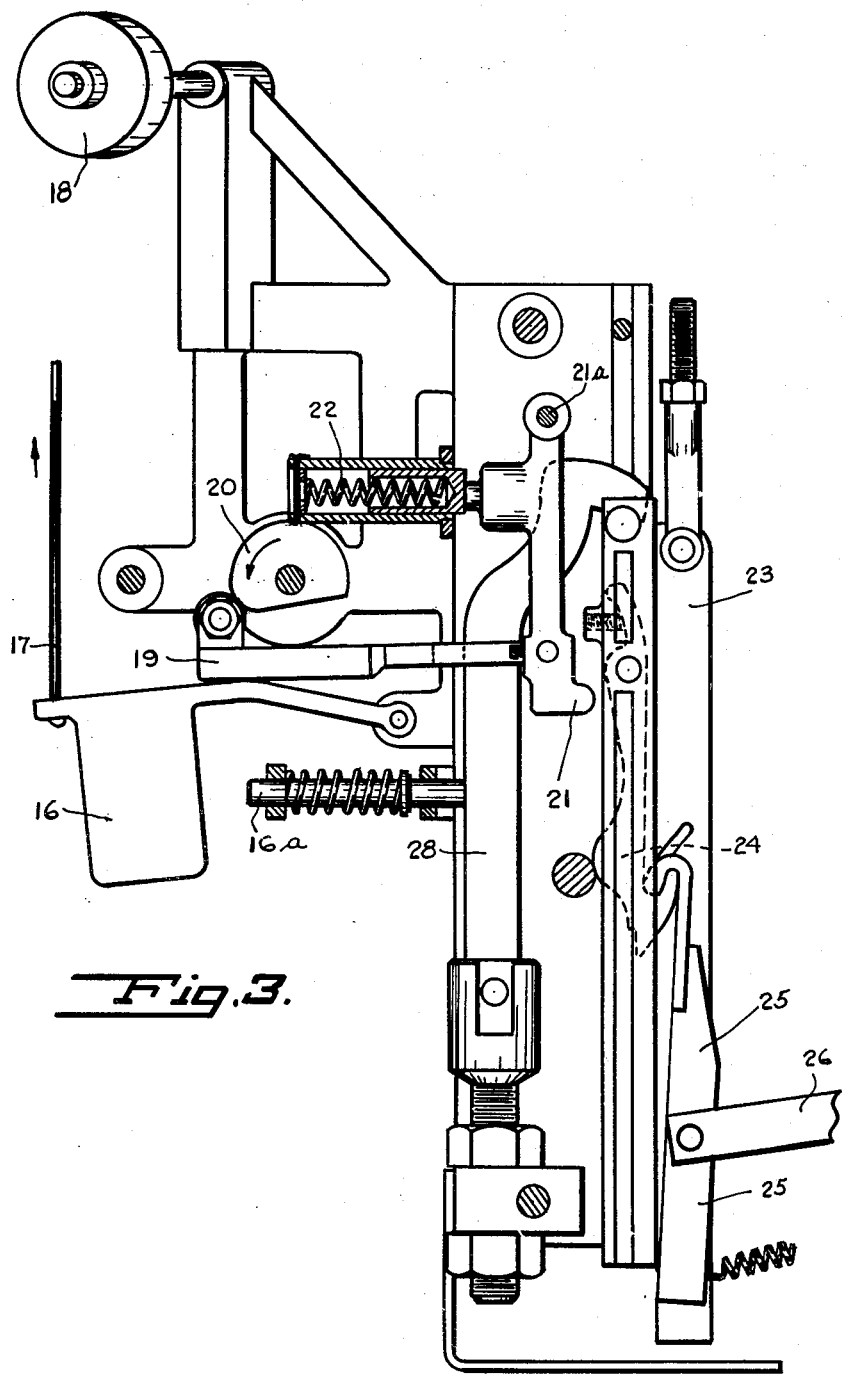

Sept. 15, 1964 E. G. GAGE 3,148,709
CHANGE BOX CONTROL
Filed June 26, 1962 6 Sheets-Sheet 4
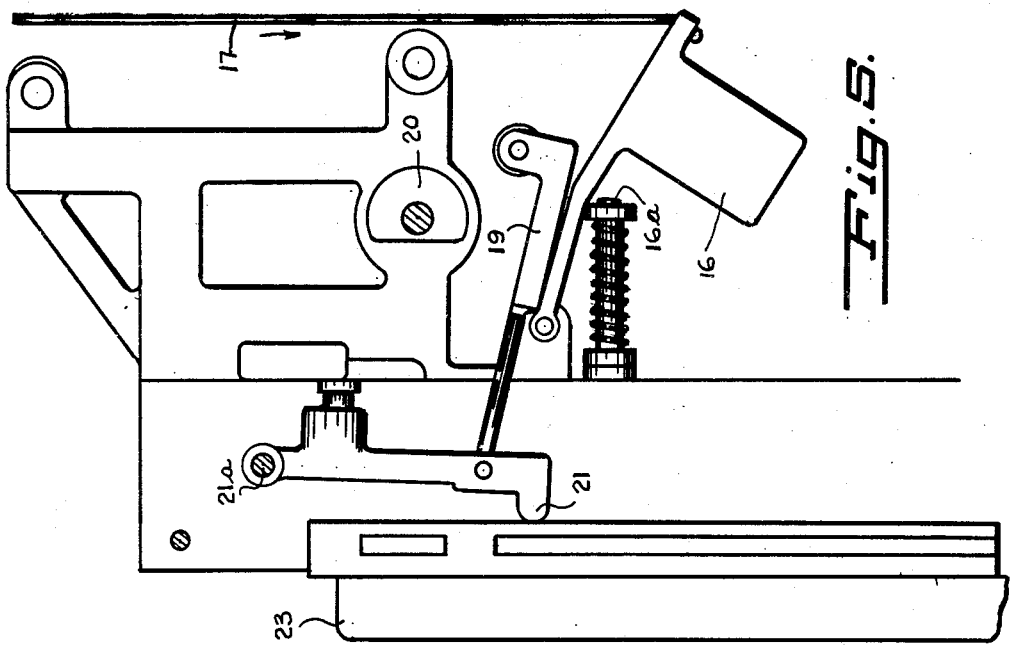
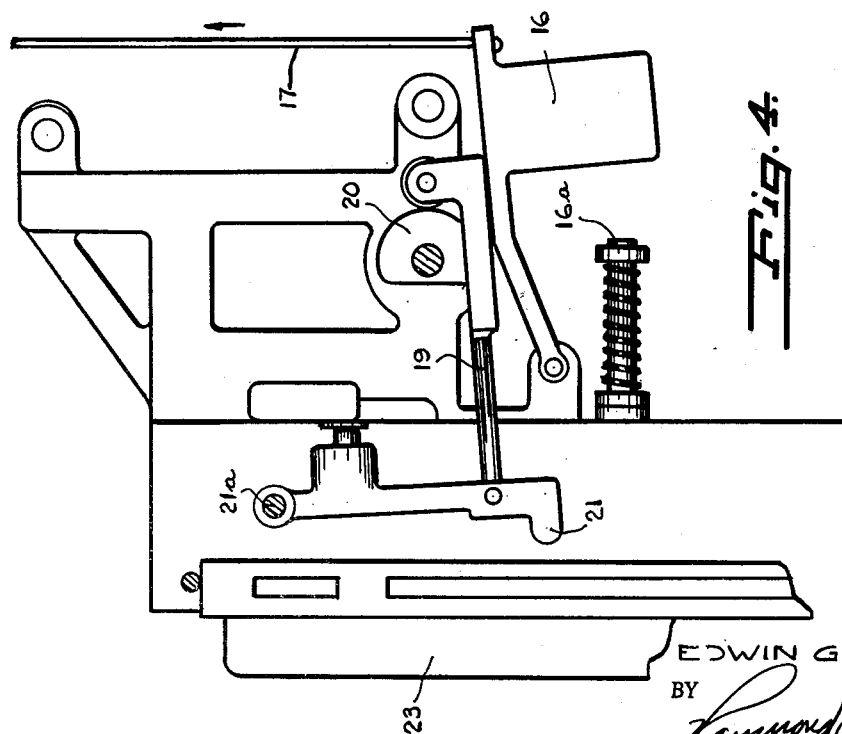
INVENTOR.
EDWIN G. GAGE
BY
Raymond A. Paquin
ATTORNEY.

Sept. 15, 1964        E. G. GAGE        3,148,709
CHANGE BOX CONTROL
Filed June 26, 1962        6 Sheets-Sheet 5
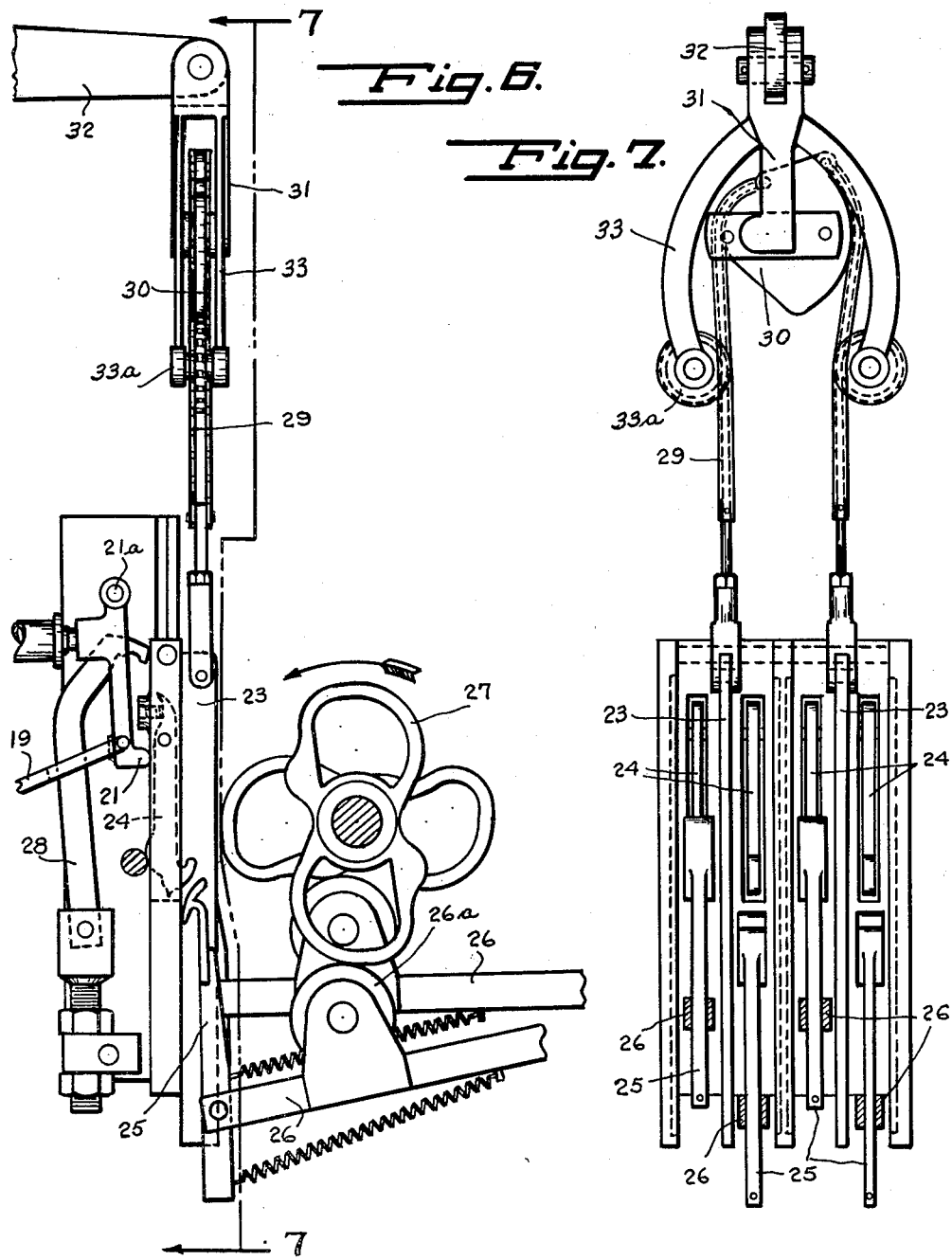
INVENTOR.
EDWIN G. GAGE
BY
Raymond A. Paquin
ATTORNEY.

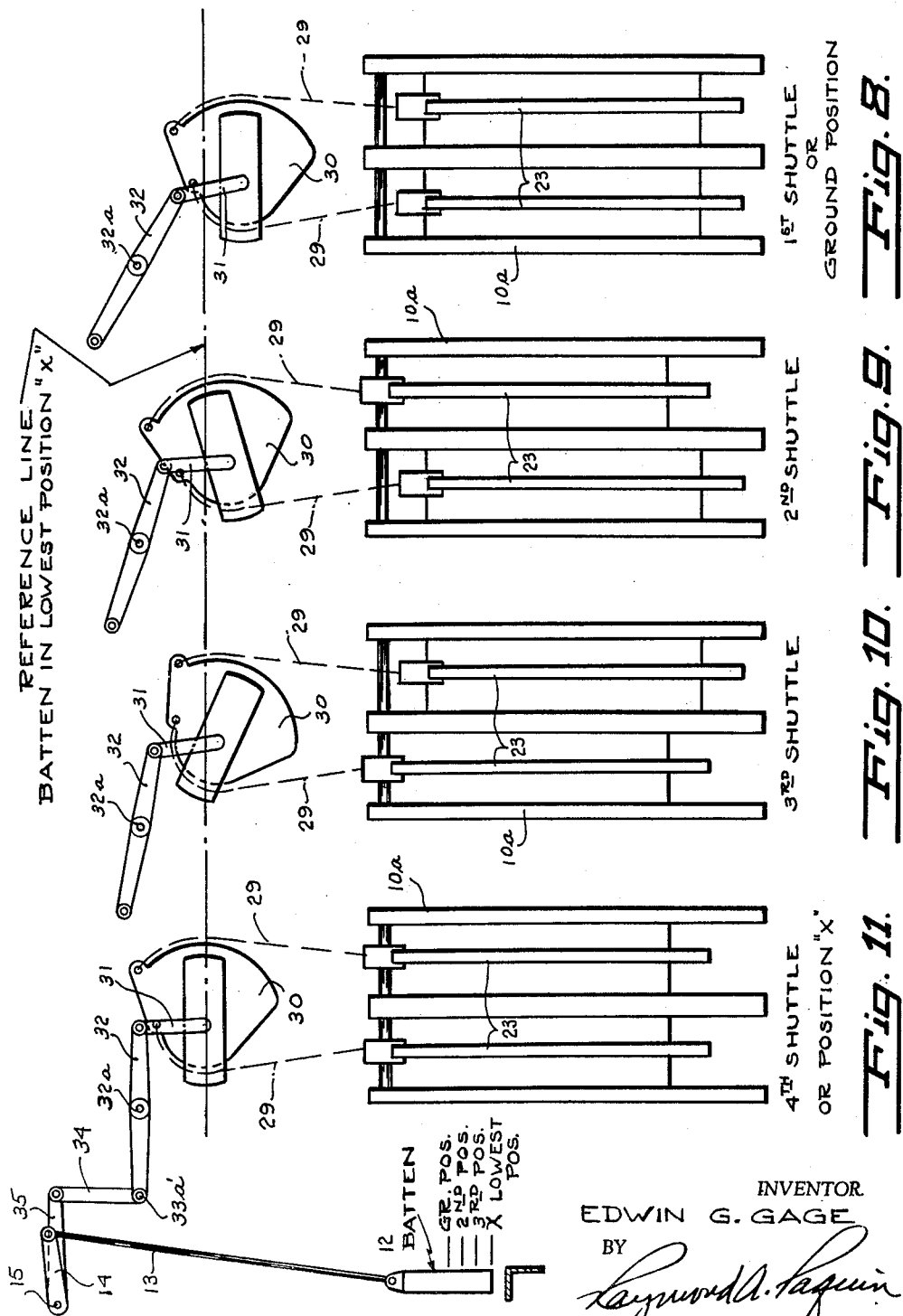

United States Patent Office 3,148,709
Patented Sept. 15, 1964

3,148,709
CHANGE BOX CONTROL
Edwin G. Gage, % Gilbertville Woven Label Corporation, Gilbertville, Mass.
Filed June 26, 1962, Ser. No. 205,331
6 Claims. (Cl. 139—171)

This invention relates to a new and improved change box control for apparatus such as, for example, automatic looms, which control provides four steps of lift with only two slideboards.

An object of the invention is to provide a new and improved control apparatus of the type set forth which control apparatus is directly and simply connected to the apparatus which it controls and, thus, which eliminates the need for a complicated network of wire connectors.

Another object of the invention is to provide a new and improved control apparatus of the type set forth which is completely mechanically connected and requires no electrical connections.

Another object of the invention is to provide a new and improved control apparatus of the type set forth which is more economical to operate and more easily maintained than existing devices of its type.

Another object of the invention is to provide a new and improved control apparatus for use with an automatic loom or the like, which control apparatus can control said accompanying loom though four stages of lift.

Another object of the invention is to provide a new and improved control apparatus of the type set forth having only two slideboards, which control apparatus can control its accompanying apparatus through four stages of lift.

Another object of the invention is to provide a new and improved control apparatus of the type set forth for use with an automatic loom, which control apparatus can cause said accompanying loom to interweave threads of four different colors at one time.

Another object of the invention is to provide a new and improved control apparatus of the type set forth having only two slideboards, which control apparatus can cause an accompanying loom to interweave threads of four different colors at one time.

Other objects and advantages of the invention will be apparent from the following description taken in connection with the accompanying drawings and it will be understood that changes may be made in the details of construction and arrangement of parts shown and described, as the preferred form has been given by way of illustration only. Furthermore, the invention has been shown as applied to an automatic loom for the purpose of illustration only and it will be understood that it may also be embodied in other apparatus.

Referring to the drawings:

FIG. 2 is a rear view of the change box apparatus shown in FIG. 1;

FIG. 3 is a side view of the change box apparatus shown in FIG. 2 with a slideboard in its downward position;

FIG. 4 is a side view taken from the side opposite that of FIG. 3 showing the position of the change box apparatus when a slideboard is in its extreme upward position;

FIG. 5 is a side view taken from the same side as FIG. 4 showing the position of the change box apparatus when a slideboard is in its extreme downward position;

FIG. 6 is a side view of the slideboard apparatus taken from the side illustrated in FIG. 2 showing a slideboard in a partially raised position;

FIG. 7 is a front view of the device shown in FIG. 6 showing the two slideboards in their partially raised positions;

FIG. 8 is a schematic view of the cam, slideboards and batten showing the position of the slideboards when the batten is in its highest or ground position;

FIG. 9 is a schematic view of the cam, slideboards and batten showing the position of the slideboards when the batten is in its first partially depressed position;

FIG. 10 is a schematic view of the cam, slideboards and batten when the batten is in its second partially depressed position; and FIG. 11 is a schematic view of the cam, slideboards and batten when the batten is in its fully depressed position.

Figure 1:
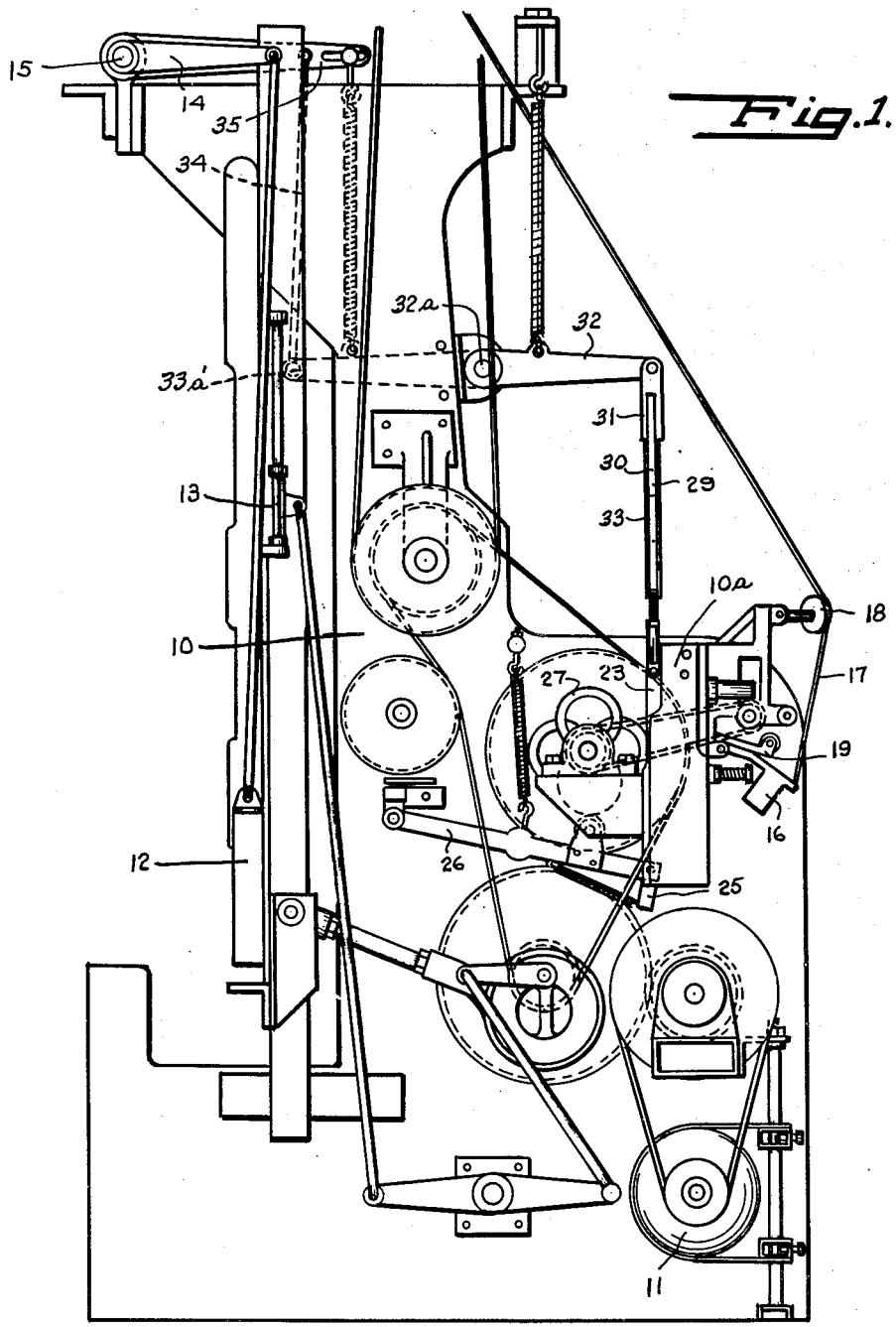
FIG. 1 is a side view of the control apparatus in position upon an automatic loom of the overslung type.

Referring more particularly to the drawings wherein similar reference characters designate corresponding parts throughout the several views, the device shown embodying the invention comprises an overslung type automatic loom 10 having four banks or levels of shuttles and being connected to and powered by the motor 11 in the usual manner and including a hanging batten 12 which batten is suspended from the top of said loom by a connecting rod 13 with said connecting rod 13 being connected to an arm 14 which arm 14 is rigidly mounted upon the shaft 15 such that when the batten 12 is moved in a vertical direction such as to move the rod 13 and, hence, the arm 14, the shaft 15 rotates. Said loom 10, furthermore, is of the type known in the art as a Gage loom and is of the overslung type as the batten 10 swings from overhead swing arms.

Mounted above the loom 10 and powered by the motor 11 in the usual manner is a Jacquard unit (not illustrated). This Jacquard unit functions in its normal manner and forms no part of the present invention.

A change box 10a is mounted upon the side of the loom 10. The change box apparatus comprises the levers 16 mounted upon said control box 10a and connected by means of the wires 17 to the Jacquard unit (not shown) such that said levers 16 are controllable for vertical movement within predetermined limits, the lower limit of which being determined by stops 16a positioned below said levers 16, by said Jacquard unit upon variations in the pattern contained therein, with said wires 17, before completing their connections of said levers 16 to the Jacquard unit passing over the rollers 18 located upon the change box body above the levers 16.

Linkages 19 are provided immediately above said levers 16 such that the upward movements of the levers 16 in response to a pull upon the wires 17 by the Jacquard unit will force said linkages 19 upwardly such that the linkages 19 will come in contact with and ride upon cams 20, said cams 20 being mounted for rotation upon the control box body immediately above the linkages 19; this contact between the linkages 19 and the cams 20 determining the upper limit of movement of the levers 16.

Hammers 21 are pivotally connected to the change box body 10a at 21a, the upper ends of said hammers 21 being connected to springs 22 such that the springs 22 in their normal uncompressed state exert a force against the hammers 21 such as to push said hammers 21 towards the slideboards 23, which are positioned the usual distance from said hammers 21, and with the lower ends of said hammers 21 being attached to the linkages 19 such that when said linkages 19 are caused to ride upon the cams 20 a pulling force is thereby exerted upon the hammers 21 in the direction opposite to that in which the springs 22 exert a pushing force in their normal uncompressed state, which pulling force is of sufficient power to overcome the push of said springs 22.

Two slideboards 23 containing slideboard hooks 24 are positioned directly in front of the hammers 21 and such a distance therefrom that the hammers 21, through the force of the springs 22 in their normal uncompressed state, can hit said slideboard hooks 24 and, thusly can cause them to engage treadle hooks 25, which treadle hooks 25 are mounted upon treadles 26 for vertical movement in the usual manner such that, when in the normal course of operation of the control apparatus the treadle hooks 25 are out of engagement with slideboard hooks 24, the riding of roller means 26a of said treadles 26 upon the treadle cams 27 will cause such vertical movement of said treadle hooks. However, when changes in the pattern cause the Jacquard to, in the previously described manner, cause the hammers 21 to hit the slideboard hooks 24, this vertical movement of the treadle hooks 25 enables said treadle hooks 25 to engage said slideboard hooks 24 and, thus, to pull the two slideboards 23 to its lowered position. Once said slideboards 23 are in such lowered position, the engagements of the treadle hooks 25 and the slideboard hooks 24 assist in maintaining them in such position.

The master hooks 28 which are mounted upon the change box are also provided to assist in holding the two slideboards 23 in their lowered positions after they have been placed in such position through the force of the hammers 21 upon the slideboard hooks 24 and said slideboard hooks 24 have engaged the treadle hooks 25. Said master hooks 28 accomplish this task by engaging the top of the slideboards 23 and exerting a downward force thereupon.

The control mechanism which enables the control apparatus to control this automatic loom 10 of the type that interweaves four different threads comprises the two slideboards 23, said slideboards 23 being connected by chains or other flexible connecting members 29 to the adjacent opposite upper ends of a cam 30 with said chains 29 riding upon the sides of said cam 30 such that the desired lift is given to the slideboards 23 said lift being determined by the side profiles of said cam 30; the cam 30 possessing the side profiles necessary for the stages of lift desired and being positioned above the slideboards 23 and mounted in hanger 31; said hanger 31 hanging said cam 30 and being pivotally connected to a cam arm 32, which cam arm 32 said hanger connects to said cam 30; a weight 33 connected upon said cam arm 32 adjacent to said hanger 31, said weight being of a horse shoe shape and including at its lower ends idler rollers 33a which rollers 33a act to position the chains 29 on the sides of the cam 30; and said cam arm 32 pivotally mounted at 32a such that movement of one of its ends downwardly thereby causes the other end to move upwardly and having an end opposite to that which is connected to said hanger 31 connected to a connecting rod 34; said connecting rod 34 being pivotally connected at 33a' and connecting the cam arm 32 to the lift arm 35 on the shaft 15 such that the movements of the cam 30 are transferred to said lift arm 14; and said lift arm 35 rigidly mounted upon the shaft 15 adjacent to the arm 14 which is connected to the batten 12 of the loom.

Due to this linkage between the cam 30, the cam arm 32, and the hanging batten 12, the constant downward pull of the weight of the batten 12 exerts a constant upward pull upon said cam 30 and said cam arm 32.

Through this connection of the cam arm 32 through the aforestated linkage means to the lift arm 14, movements of the cam 30 and, hence, the cam arm 32 are transferred to the shaft 15 and, from there, through arm 14 and rod 13 to the batten 12 thereby changing the position of said batten 12 and, hence, thereby changing the shuttle of the loom 10 in operation. Thus, as the control device possesses two slideboards 23 and such two slideboards 23 can be placed in four different positions relative to each other as is shown in FIGS. 8 through 11 and as, also, the movements of said slideboards 23 in the obtaining of these four relative positions can, through the resultant movement of the cam 30 to four different positions and its resultant effects be transferred to the batten 12; the batten 12 can obtain four different positions. Hence, the control apparatus having only the two slideboards 23 can be used to control a batten possessing four positions throughout all four of its positions and, hence, the control apparatus of this invention can be used to control a loom interweaving threads of four different colors.

Furthermore, as the side profile of the cam 30 determines the degree of lift of the slideboards 23, by the changing of the cam 30 to one of a different profile the degree of lift of the slideboards 23 may be changed.

In operation with the slideboards 23 in their lowered first shuttle position and the batten 12 in its raised or ground position as is shown in FIG. 8, when the Jacquard unit, in following its enclosed pattern, decides that a change in thread color is needed (for the purposes of this illustration I will assume that the thread color in the fourth shuttle is desired) it exerts a pull through the wires 17 upon both of the levers 16. Said levers 16, thereupon, move upwardly pushing the linkages 19 upon the cams 20 and, thereby, pulling the hammers 21 out of contact with the slideboard hooks 24 in the two slideboards 23.

The slideboard hooks 24, thereupon, disengage from the treadle hooks 25 and the slideboards 23 push the master hooks 28 out of engagement with said slideboards 23. Thereupon, the slideboards rise to their extreme upward position.

While the slideboards 23 remain in this position, the treadle hooks 25 ride up and down out of contact with the slideboard hooks 24 due to the action of the treadle cam 27 upon the treadle 26.

The upward movement of the two slideboards 23, through the resultant change in the pull of said slideboards 23 upon the cam 30 through connecting members 29, causes the cam to shift position until it attains the position shown in FIG. 11. This revolution of said cam 30 thereby causes the cam arm 32 to pivot both upon the cam and at pivot point 32a on said cam arm 32 until it too obtains the position shown in FIG. 11.

This pivoting of the cam arm 32 causes connecting rod 34 to also pivot at 33a' and to exert a force on lift arm 35 mounted on shaft 15 such as to cause the arm 14 mounted on said shaft to move downwardly. This downward movement is transferred through connecting rod 13 to the batten 12 such that said batten likewise moves downwardly, thereby going to its lowest position and placing the fourth shuttle of the loom into operation.

Likewise, should the pattern in the Jacquard require that either the second or the third shuttle of the loom be placed into operation, the wire 17 connected to the proper lever 16 only is pulled by the Jacquard unit and the other wire 17 is left in its existing position such that the relative positions of the slideboards 23 and cam 30 as shown in FIG. 9 are obtained if the second shuttle is to be placed into operation or as shown in FIG. 10 if the third shuttle is to be placed in operation.

From the foregoing it will be seen that I have provided a new and improved change box control possessing only two slideboards, which control provides four steps of lift.

From the foregoing it will be seen that I have provided a new and improved means which is both simple and efficient for obtaining all of the objects and advantages of the invention.

I claim:

1. A change box control for an automatic loom which is adapted to interweave four different threads and which includes a batten adapted to shift the shuttle of the loom to four different operating positions, said change box control comprising, a pair of slideboards, a hanger positioned above said pair of slideboards, a pivotally mounted cam having cam profiles on two of its opposite sides carried by said hanger above said pair of slideboards, flexible connecting means connecting the opposite upper ends of said cam with said pair of slideboards, said flexible connecting means riding upon said cam profiles of said cam in making said connection, and a cam arm pivotally connected adjacent one of its ends to said hanger such as to be operatively connected by said hanger to said cam, said cam arm being operatively connected adjacent its end opposite to that connected to said hanger to the batten of the automatic loom such that movement of said cam is transmitted to said batten for conrolling the operation thereof.

2. A change box control for an automatic loom which is adapted to interweave four different threads and which includes a batten adapted to shift the shuttle of the loom to four different operating positions, said change box control comprising, a pair of slideboards, a hanger positioned above said pair of slideboards, a pivotally mounted cam carried by said hanger above said slideboards, said cam having cam profiles on two of its opposite sides, flexible connecting means connecting each of the adjacent opposite upper ends of said cam to one of said pair of slideboards, said flexible connecting means riding upon said cam profiles on said cam, and a cam arm pivotally connected adjacent one of its ends to said hanger and thereby operatively connected to said cam such that movement of said cam causes corresponding movement of said cam arm, said cam arm being operatively connected adjacent its end opposite to that connected to said hanger to the batten of the automatic loom such as to transmit said movement of said cam thereto.

3. A change box control for an automatic loom which is adapted to interweave four different threads and which includes a batten adapted to shift the shuttle of he loom to four different operating positions, said change box control comprising, a pair of slideboards adapted to be controlled by means external to said change box control, a hanger positioned above said pair of slideboards, a pivotally mounted cam carried by said hanger above said slideboards, said cam having cam profiles on two of its opposite sides, flexible connecting means connecting each of the opposite upper ends of said cam to one of said pair of slideboards, said flexible connecting means riding upon said cam profiles on said cam in making said connection, and a cam arm pivotally connected adjacent one of its ends to said hanger such that movement of said cam causes corresponding movement of said cam arm, and linkage means connecting said cam arm adjacent its free end with the batten of the automatic loom such that said cam arm transmits said movement of said cam to said batten for controlling the operation of the loom.

4. A change box control for an automatic loom which is adapted to interweave four different threads and which includes a batten adapted to shift the shuttle of the loom to four different operating positions, said change box control comprising, a pair of slideboards adapted to be controlled by means external to said change box control, a hanger positioned above said pair of slideboards, a cam having two opposite cam profiles pivotally carried by said hanger above said pair of slideboards, flexible connecting means connecting the opposite upper ends of said cam with said slideboards and passing over said cam profiles in making said connection, and cam arm means operatively connecting said cam with the batten of the loom such that movements of said cam upon said hanger are transmitted to said batten and, therefrom, to the shuttle of the loom.

5. A change box control for an automatic loom which is adapted to interweave four different threads and which includes a batten adapted to shift the shuttle of the loom to four different operating positions, said change box control comprising, a pair of slideboards adapted to be urged to four different relative positions by means external to said change box control, means external to said change box control for urging said pair of slideboards to said four different relative positions, a hanger positioned above said pair of slideboards, a cam pivotally mounted in said hanger above said pair of slideboards, flexible connecting means connecting said cam adjacent its opposite sides to said pair of slideboards, and cam arm means operatively connecting said cam to the batten of the automatic loom such that movement of said cam is transmitted to movement of said batten.

6. A change box control for an automatic loom which is adapted to interweave four different threads and which includes a batten adapted to shift the shuttle of the loom to four different operating positions, said change box control comprising, a pair of slideboards, means external to said change box control for controlling the operation of said slideboards, a hanger positioned above said slideboards, a cam pivotally carried by said hanger above said slideboards, flexible connecting means operatively connecting the opposite upper ends of said cam with said slideboards such that movement of said slideboards relative to each other actuates movement of said cam, said cam including a pair of oppositely disposed cam profiles and said connecting means being urged against said cam profiles by positioning means, said positioning means adjacent said cam profiles, and a cam arm pivotally connected adjacent its opposite ends to said hanger and linkage means operatively connected to the batten of the automatic loom such that pivotal movement of said cam due to the movement of said slideboards is transmitted to said batten for controlling the operation of the shuttle of the loom.

References Cited in the file of this patent

UNITED STATES PATENTS

| | | |
|---|---|---|
| 225,115 | Doering | Mar 2, 1880 |
| 708,752 | Barbier | Sept. 9, 1902 |
| 2,490,589 | Gage et al. | Dec. 6, 1949 |

FOREIGN PATENTS

| | | |
|---|---|---|
| 16,489 | Great Britain | of 1896 |
| 732,580 | Great Britain | June 29, 1955 |
| 359,092 | France | Jan. 10, 1906 |
| 2,178 | Germany | Oct. 26, 1877 |
| 38,907 | Germany | Apr. 2, 1887 |
| 43,144 | Germany | Mar. 4, 1888 |